(12) United States Patent
Gesbert et al.

(10) Patent No.: US 10,545,251 B2
(45) Date of Patent: Jan. 28, 2020

(54) COMPUTER SYSTEM AND METHOD FOR GENERATING ATTRIBUTE RENDERINGS FROM A SEISMIC DATA VOLUME

(71) Applicant: SHELL OIL COMPANY, Houston, TX (US)

(72) Inventors: Stéphane Youri Richard Michael Joachim Gesbert, Rijswijk (NL); Russell David Potter, Houston, TX (US); Tjipto Santoso, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/770,826

(22) PCT Filed: Oct. 27, 2016

(86) PCT No.: PCT/US2016/059185
§ 371 (c)(1),
(2) Date: Apr. 25, 2018

(87) PCT Pub. No.: WO2017/075255
PCT Pub. Date: May 4, 2017

(65) Prior Publication Data
US 2018/0306938 A1   Oct. 25, 2018

(30) Foreign Application Priority Data
Oct. 29, 2015  (EP) ..................................... 15192160

(51) Int. Cl.
*G06T 15/00*       (2011.01)
*G01V 1/34*        (2006.01)
(Continued)

(52) U.S. Cl.
CPC ................ *G01V 1/345* (2013.01); *G01V 1/34* (2013.01); *G06F 3/04812* (2013.01);
(Continued)

(58) Field of Classification Search
CPC ...... G01V 1/345; G01V 2210/74; G01V 1/34; G06T 2200/24; G06T 15/005; G06T 15/08; G06F 3/04842; G06F 3/04812
See application file for complete search history.

(56) References Cited

U.S. PATENT DOCUMENTS

2013/0226968 A1* 8/2013 Wagner .................... G01V 1/30
                                                        707/776
2014/0081613 A1  3/2014 Dommisse et al.

FOREIGN PATENT DOCUMENTS

| WO | 2009018525 A2 | 2/2009 |
| WO | 2009126951 A2 | 10/2009 |
| WO | 2013039953 A1 | 3/2013 |

OTHER PUBLICATIONS

Patel et al., "Seismic Volume Visualization for Horizon Extraction", IEEE, 2010. (Year: 2010).*

(Continued)

*Primary Examiner* — Nicholas R Wilson (57) ABSTRACT

The computer system and computer-implemented method allow a user to position an interactive cursor my interaction with a user-input device, to select a point anywhere within a 3D seismic data volume that is visible on a display. In response, the computer dynamically calculates a horizon-based stratal slice that includes the user-selected point. A selected attribute rendering from seismic data that is contained within the horizon-based stratal slice is automatically calculated and dynamically shown on a second display.

20 Claims, 4 Drawing Sheets

(51) Int. Cl.
    *G06F 3/0481*    (2013.01)
    *G06F 3/0484*    (2013.01)
    *G06T 15/08*     (2011.01)
(52) U.S. Cl.
    CPC ........ *G06F 3/04842* (2013.01); *G06T 15/005* (2013.01); *G06T 15/08* (2013.01); *G01V 2210/74* (2013.01); *G06T 2200/24* (2013.01)

(56) References Cited

OTHER PUBLICATIONS

Zeng et al., "Stratal slicing, Part II: Real 3-D Seismic Data", Geophysics, vol. 63, 1998 (Year: 1998).*
International Search Report and Written Opinion received for PCT Patent Application No. PCT/US2016/059185, dated Jan. 31, 2017, 10 pages.
Zeng et al.,"Stratal slice: a tool for seismic sedimentologic imaging and reservoir prediction", 12th International Congress of the Brazilian Geophysical Society & EXPOGEF, Rio de Janeiro, Brazil, Aug. 15-18, 2011, pp. 789-792, XP002761042.
Zeng, "Stratal slicing: Benefits and challenges", The Leading Edge, vol. 29, Issue 9, Sep. 2010, pp. 1040-1047, XP002761043.

* cited by examiner

COMPUTER SYSTEM AND METHOD FOR GENERATING ATTRIBUTE RENDERINGS FROM A SEISMIC DATA VOLUME

CROSS REFERENCE TO RELATED APPLICATIONS

This is a national stage application of PCT/US2016/059185, filed 27 Oct. 2016, which claims priority of European application No. 15192160.8, filed 29 Oct. 2015.

FIELD OF THE INVENTION

The present invention relates to an apparatus and method of generating and displaying attribute renderings from a 3D seismic data volume.

BACKGROUND OF THE INVENTION

Three dimensional seismic data volumes (sometimes referred to as seismic data volume or seismic cube) comprise a two-dimensional array of acoustic responses of the subsurface which have been collected in a selected area. Acoustic impedance contrasts in the subsurface, which may be associated with lithological boundaries between layers of rock, cause partial reflection of seismic waves travelling through the subsurface. Features in the seismic responses that are caused by such acoustic impedance contrasts are referred to as "seismic events". In reflection seismology, seismic events correspond to depths of reflected seismic waves.

The three dimensions of a seismic data volume are composed of two lateral dimensions representing geographic locations in the subsurface which can be expressed in or converted to a latitude and longitude, and one depth dimension which can be expressed in or converted to a unit of elevation relative to a standard such as average sea level at the geographic locations. The depth dimension may be represented in units of time, suitably corresponding to two-way travel times of seismic events at various depths, at a plurality of lateral coordinates. The depth dimension may also be represented in units of length, which may be suitable to represent migrated seismic data.

Within a seismic data volume, some events can collectively be attributed to a continuous reflecting surface that spans over a large part of, or the entire, seismic cube. A horizon is an imaginary surface in the seismic data volume, which connects all seismic events that correspond to reflections from a single reflecting surface in the formation.

Seismic interpreters are interested to image events between horizons. Geologically, a horizon is representative of a single geological age. When studying events in seismic data volumes that manifest between horizons, it is useful to study the events in planes that are equidistant from a horizon (so-called horizon-conformant slices) or proportionally defined between two horizons (proportional slices). Either way is an approximation of a section through one geological depth and could reveal basin sedimentary infill and erosive features which help in ascertaining presence and nature of mineral hydrocarbons.

In practice, a computer is needed to display views within a 3D seismic data volume, and views of attribute renderings of the seismic data within the selected slice. Stratal software allows a seismic interpreter to specify one or two horizons and a "distance" (expressed in depth difference) from one of the horizons and, optionally, a slab thickness representing a depth interval band around the slice. It is quite a time consuming process to view sequences of attribute renderings of multiple slices one after another.

It is an object of the invention to improve the user interface with the aim to enhance the speed at which sequences of attribute renderings along multiple slices can be displayed and viewed.

SUMMARY OF THE INVENTION

In accordance with a first aspect of the present invention, there is provided a computer system for generating and displaying attribute renderings from a seismic data volume, comprising:

a first computer readable memory wherein a 3D seismic data volume is stored, said 3D seismic data volume comprising two lateral dimensions and one depth dimension;

a second computer readable memory wherein a plurality of horizons is stored, of which plurality of horizons each horizon is a surface that connects selected seismic events in the 3D seismic data volume that correspond to a single geological feature that corresponds to the selected seismic events;

a first display on which the 3D seismic data volume is shown, together with an interactive cursor;

a user-input device configured to control the interactive cursor, by means of which a user can select any point within the 3D seismic data volume on or between said plurality of horizons;

a first processing unit programmed with computer executable instructions to dynamically calculate a horizon-based stratal slice through the 3D seismic data volume based on at least one of the horizons of said plurality of horizons and which includes a user-selected point within the 3D seismic data volume on or between the plurality of horizons as indicated by the interactive cursor in response to interaction of the user with the user-input device;

a second processing unit connected to the first processing unit, and programmed with computer executable instructions to dynamically generate a selected attribute rendering from seismic data that is contained within a slab that contains the horizon-based stratal slice;

a second display on which the selected attribute rendering is shown.

In accordance with a second aspect of the present invention, there is provided a computer-implemented method for generating and displaying attribute renderings from a seismic data volume, comprising:

loading into a first processing unit a 3D seismic data volume from a first computer readable memory, said 3D seismic data volume comprising two lateral dimensions and one depth dimension;

providing in the first processing unit a plurality of horizons, of which plurality of horizons each horizon is a surface that connects selected seismic events in the 3D seismic data volume that correspond to a single geological feature that corresponds to the selected seismic events;

displaying the 3D seismic data volume on a first display, together with an interactive cursor;

interacting of a user with a user-input device, comprising moving the interactive cursor on the first display to any point within the 3D seismic data volume on or between said plurality of horizons with the interactive cursor, in response to said interacting with the user-input device, and selecting a user-selected point corresponding the point within the 3D seismic data volume as indicated by the interactive cursor;

dynamically performing computer executable instructions in a first processing unit with the effect of dynamically calculating a horizon-based stratal slice through the 3D seismic data volume based on at least one of the horizons of said plurality of horizons and which includes the user-selected point;

dynamically performing computer executable instructions in a second processing unit with the effect of generating a selected attribute rendering from seismic data that is contained within a slab that contains the horizon-based stratal slice;

displaying the selected attribute rendering on a second display.

The invention will be further illustrated hereinafter by way of example only, and with reference to the non-limiting drawing.

BRIEF DESCRIPTION OF THE DRAWING

These figures are not to scale. Identical reference numbers used in different figures refer to similar components.

DETAILED DESCRIPTION OF THE INVENTION

The person skilled in the art will readily understand that, while the invention is illustrated making reference to one or more a specific combinations of features and measures, many of those features and measures are functionally independent from other features and measures such that they can be equally or similarly applied independently in other embodiments or combinations.

The present disclosure involves a computer system and a computer-implemented method that allows a user to position an interactive cursor by interaction with a user-input device, to select a point anywhere within a 3D seismic data volume that is visible on a display. In response, the computer dynamically calculates a horizon-based stratal slice that includes the user-selected point, based on one or more of a plurality of horizons stored in the computer system. A selected attribute rendering from seismic data that is contained within the slab that contains the horizon-based stratal slice is automatically calculated and dynamically shown on a second display.

Herewith an improved graphical user interface (GUI) is provided, which allows the user to change the position of the interactive cursor in the 3D seismic data volume by a straight forward, user-friendly, interaction of the user with the user-input device. The selected attribute rendering on the second display is dynamically updated, on the fly, to conform to the new position of the interactive cursor when this position is changed by the user.

The horizon-based stratal slice may be, for instance, be a horizon-conformant slice relative to a first nearest horizon, or a proportional slice between a first nearest horizon and a second nearest horizon. Both types of stratal slices are frequently used by seismic interpreters.

In preferred embodiments, the computer automatically identifies the first nearest horizon, encountered from the user-selected point (as identified by the interactive cursor) in a specified first direction along a depth axis in the seismic data volume. The computer may also automatically identify the second nearest horizon of said plurality of horizons encountered from the selected point, in a specified second direction along a depth axis in the depth dimension which second direction is opposite to the first direction. In such preferred embodiments, the user does not have to specify the horizon or horizons which the computer employs to calculate the horizon-based stratal slices. Instead, the computer automatically identifies the nearest horizon(s) in specified direction(s) from any point in the seismic data volume as selected by the user via the interactive cursor. In addition, the computer automatically uses the so identified nearest horizon(s) to dynamically calculate the horizon-based stratal slice and to dynamically update the selected attribute rendering on the second display. All the user has to do is to move the interactive cursor to the desired point and optionally to expressly confirm a selection of the point. The thus improved GUI allows the user to quickly scroll through the 3D seismic data volume while looking at the selected attribute renderings which are repeatedly updated in accordance with the movements of the interactive cursor.

The user can change the position of the interactive cursor through the depth dimension in the 3D seismic data volume by interaction of the user with the user-input device, whereby selecting a new user-selected point. In convenient and time-saving preferred embodiments, the user-input device comprises a fixed-step interaction mode in which the interaction of the user with user-input device induces the interactive cursor to change its position through the depth dimension by a pre-determined distance interval along the depth-axis. Suitably, the user-input device comprises a key, which may for instance be the arrow key on a standard key-board. By each tap of the key induced the interactive cursor moves along the depth-axis by the pre-determined distance.

The user may also specify a thickness of a slab around the horizon-based stratal slice (usually expressed in the same unit of depth corresponding to the depth axis in the 3D seismic data volume). The dynamically calculated slab may span over a constant interval around the horizon-based stratal slice that contains the user-selected point. However, in case of proportional slices, the slab thickness may be proportional, instead. In the latter case, the slab thickness as specified by the user may be the average thickness of the slab within the 3D seismic data volume.

In the context of the present specification, a "user-input device" is any means or combination of means that a user can interact with and that is capable of controlling an interactive cursor on a display. Examples of user-input devices include, but are not limited to: a joystick, a tracker ball, a computer mouse, a mouse pad, a keyboard, a touch-screen, an eyeball detector, or the like.

In the context of the present specification, an "interactive cursor" is an indicator visible on the first computer display, that visibly indicates the current position for user interaction with the 3D seismic data and that is responsive to input from the user-input device. An interactive cursor is suitably, but not necessarily, represented by any one or a combination of: a dot, a circle, a polygon, a cross, an arrow, a pointing hand, or the like.

In the context of the present specification, a "key" is suitably any type of button that can be pressed or activated. Examples include, but are not limited to: a key on a computer keyboard, a computer mouse button, a mouse-pad button, a joystick button, a tracker ball button, a remote control button, a virtual button displayed on a computer display.

In the context of the present specification, "dynamically" in conjunction with computer implemented actions including calculating, showing, displaying, identifying, etc. means that the computer-implemented action that "dynamically" refers to is automatically performed to conform the horizon-based stratal slice and the selected attribute rendering to the current position of the interactive cursor in real time (on the fly).

In the context of the present specification, the term "computer readable memory" may include any known type of transitory or non-transitory computer readable memory. For instance, the computer readable memory may comprise any one or a combination of: a random access memory, a read only memory, a solid state memory, a hard disc, an optical disc, a magnetic disc. In some embodiments the computer readable memory may be non-transitory. First and second computer readable memories may be embodied in distinct devices or may be united in a single device.

In the context of the present specification, a "processing unit" is understood to mean the electronic circuitry within the computer that carries out the computer executable instructions by performing basic arithmetic, logical, control and input/output (I/O) operations as specified by the computer executable instructions. First, second, and third processing units may be embodied in a plurality of distinct devices, or may be united in a single device.

In the context of the present specification, a "display" is understood to mean any device capable of visually representing real depth information including output from one or more processing units. Examples of displays include, but are not limited to: a computer monitor, a television, a cathode ray tube, an LCD screen, a plasma screen, a projector, and the like. First and second displays may be embodied in a plurality of distinct devices, or may be united in a single device.

In the context of the present specification, a "horizon" is a surface superimposed on the seismic data volume, which connects all seismic events within the 3D seismic data volume that correspond (or are interpreted to correspond) to reflections from a single to a single geological feature in the formation that has caused the selected seismic events in the 3D seismic data volume. Horizons can be stored in the computer system in a variety of known ways.

In the context of the present specification, a "horizon-based stratal slice" can be a horizon-conformant slice or a proportional slice between two bounding horizons. A horizon-conformant slice is a horizon-based stratal slice whereby each lateral coordinate within the horizon-based stratal slice is displaced along the depth axis from the horizon on which the horizon-conformant slice is based by a constant depth difference for all lateral coordinates in the horizon-based stratal slice. A proportional slice is a horizon-based stratal slice that extends between two horizons whereby the ratio of the displacement of each lateral coordinate within the horizon-based stratal slice along the depth axis from one of the two horizons and the depth difference of the two horizons at the same lateral coordinate is constant for all lateral coordinates in the horizon-based stratal slice. A proportional thickness of a slab around the stratal slice means the ratio of the thickness in each lateral coordinate along the depth axis and the depth difference of the two horizons at the same lateral coordinate is constant for all lateral coordinates in the horizon-based stratal slice.

The selected seismic attribute that is displayed in the attribute rendering may be any seismic attribute that is derived by any type of mathematical recombination of data selected from the volume or sub-volume of stack or sub-stack data. Commonly used seismic attributes for this purpose include, but are not limited to: seismic amplitude, continuity, frequency, loop attributes, and the like. The user may change the angle of view on the attribute rendering and the user may change the angle of view on the 3D seismic data volume. Furthermore, the user may view any cross section through the 3D seismic data volume.

Figure 1:
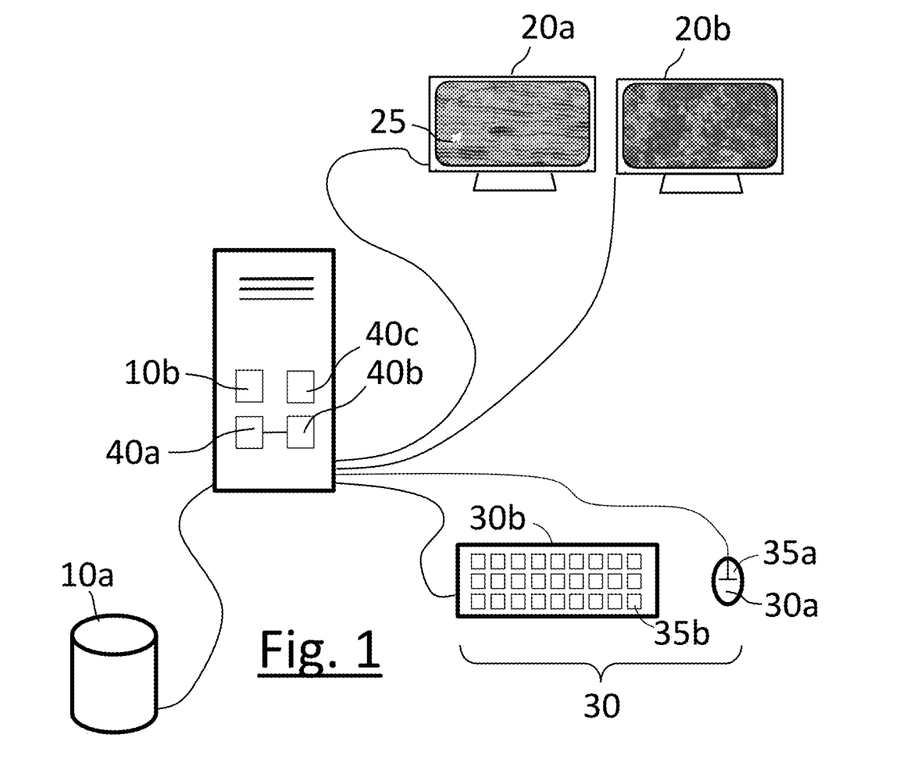
FIG. 1 shows a schematic diagram of a computer system according to an embodiment of the invention.

FIG. 1 schematically shows computer system for generating and displaying attribute renderings from a seismic data volume. The computer system comprises a first computer readable memory 10a wherein a 3D seismic data volume is stored.

The 3D seismic data volume comprises two lateral dimensions and one depth dimension. The depth dimension may be represented in units of time, suitably corresponding to two-way travel times of seismic events at various depths, at a plurality of lateral coordinates. The depth dimension may also be represented in units of length, which may be suitable to represent migrated seismic data.

The computer system further comprises a second computer readable memory 10b, wherein a plurality of horizons is stored. Each horizon is a surface that connects selected seismic events in the 3D seismic data volume that has been associated with a single geological feature. The computer system further comprises a first display 20a, on which the 3D seismic data volume is shown, together with an interactive cursor 25. Horizons may be shown as well, but this is not a requirement for the invention. It will be apparent that the computer-implemented method may further comprise a step of constructing an interactive image from the the 3D seismic data volume suitable for displaying on the first display 20a. The computer system may comprise an image processor for this purpose.

A user-input device 30 is configured to control the interactive cursor 25. The user-input device may consist of a combination plurality of elements, such computer mouse 30a and a computer keyboard 30b. A large variety of other options are available, such as roller balls, joysticks, remote controls, mouse pads, touch screens, and the like, which may be used instead or in addition to the computer mouse 30a and the computer keyboard 30b. With the user-input device 30, a user can select any point within the 3D seismic data volume on or between the plurality of horizons.

A first processing unit 40 may be provided, programmed with computer executable instructions to dynamically calculate a horizon-based stratal slice through the 3D seismic data volume based on at least one of the horizons of said plurality of horizons. The horizon-based stratal slice includes a user-selected point within the 3D seismic data volume as indicated by the interactive cursor 25 in response to interaction of the user with the user-input device 30. Suitably, the selection of the user-selected point is initially done with in a direct-access interaction mode, by means of for instance the computer mouse 30a, in which the interactive cursor 25 can be positioned directly regardless of any prior position of the interactive cursor 25. The location can be confirmed by the stroke of a key, suitably a mouse button 30a.

A second processing unit, schematically indicated at 40b, may be provided. It is connected to the first processing unit 40a, and programmed with computer executable instructions to dynamically generate a selected attribute rendering from seismic data that is contained within the slab that contains the horizon-based stratal slice. An attribute image comprising the selected attribute rendering may be constructed and outputted to a second display 20b. The second processing unit 40b may comprise an attribute image processing unit for the purpose of constructing and displaying the attribute image.

Figure 2A:
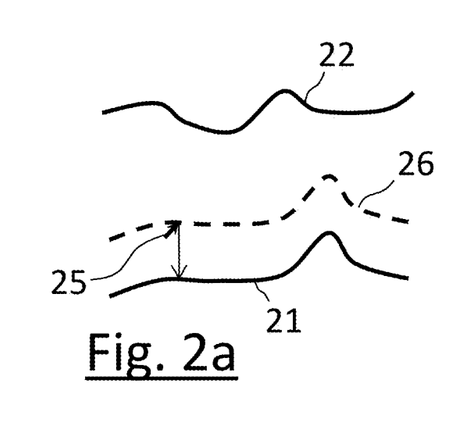
FIGS. 2a and 2b schematically illustrate horizon-conformant stratal slices.
Figure 2B:
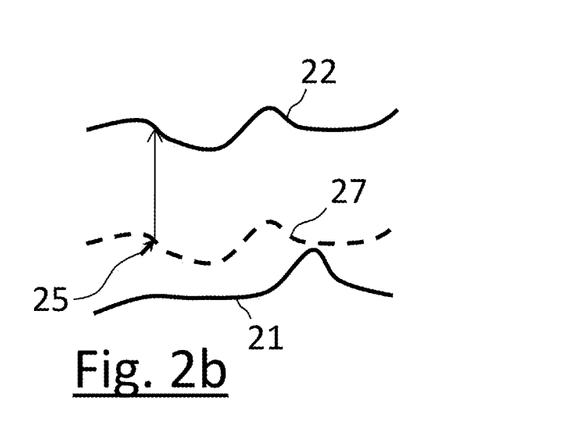

Suitably, the computer system further comprises a third processing unit 40c, which is programmed with computer executable instructions to automatically identify a first nearest horizon of said plurality of horizons from the user-selected point in a specified first direction along a depth axis in the depth dimension. This is schematically illustrated in FIGS. 2a and 2b, which show two neighboring horizons 21 and 22 and the user-selected point as indicated with the interactive cursor 25. In the figures, neighboring horizon 21 is below the user-selected point and horizon 22 is above the user-selected point. The first nearest horizon could be the first nearest horizon below the user-selected point, such as illustrated in FIG. 2a or the first nearest horizon above the user-selected point, such as illustrated in FIG. 2b. The user can indicate which one of these two nearest horizons the user wants the third processing unit 40c to find. The horizon-based stratal slice may be a so-called horizon-conformant slice relative to the first nearest horizon. Such horizon-conformant slice extends parallel to the first nearest horizon (i.e. it is equidistant to the first nearest horizon in the depth dimension). FIG. 2a illustrates such horizon-conformant slice 26 conformant to the first nearest horizon below the user-selected point while FIG. 2b illustrates such horizon-conformant slice 26 conformant to the first nearest horizon above the user-selected point.

Figure 3:
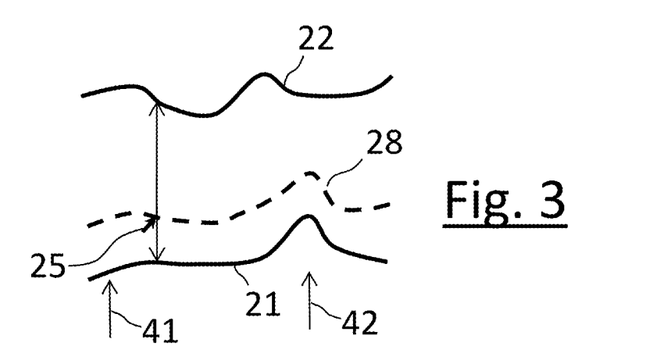
FIG. 3 schematically illustrates a proportional stratal slice.

The third processing unit may also be programmed to identify a second nearest horizon of said plurality of horizons from the user-selected point in addition to the first nearest horizon. This is illustrated in FIG. 3. The second nearest horizon is the nearest horizon from the user-selected point in a specified second direction along a depth axis in the depth dimension opposite to the first direction. Based on first and second nearest horizons, a so-called proportional horizon-based slice 28 between the first nearest horizon and the second nearest horizon can be calculated.

Figure 4A:
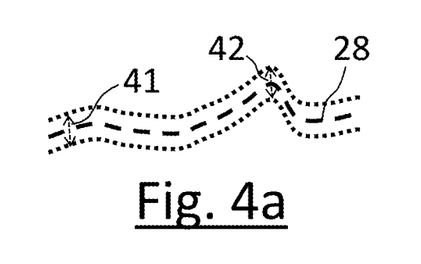
FIGS. 4a and 4b schematically illustrate embodiments of slabs around the proportional stratal slice of FIG. 3.
Figure 4B:
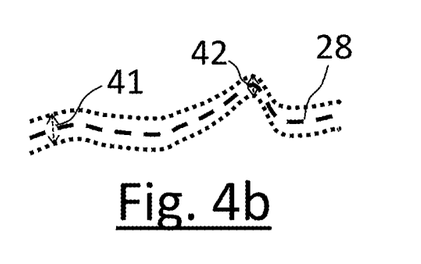

The constructed image, comprising the selected attribute rendering, which is displayed on the second display 20b may be a 2D attribute map. Such 2D attribute map may be a visualization (e.g. a color visualization) of a selected seismic attribute of the seismic data on the horizon-based stratal slice, represented in the two lateral dimensions. Alternatively, the selected attribute rendering may be a volume rendering of a selected seismic attribute based on seismic data within a slab defined by a defined depth interval band around the horizon-based stratal slice. Opacity may be used to see through the thickness of the rendering, which has been found to give a richer display. Slabs around horizon-based slice 28 are schematically in FIGS. 4a and 4b, wherein the slabs extend between the dotted lines. The slab thickness around the horizon-based stratal slice 28 may be constant, as illustrated in FIG. 4a, or proportional, as illustrated in FIG. 4b. For instance, the slab thickness indicated at 41 in FIG. 4a is identical to the slab thickness indicated at 42 in FIG. 4a or anywhere else along the horizon-based stratal slice 28. However, the slab in FIG. 4b is thicker at indicated at 41 than at 42, because the distance between the first and second nearest horizons 21 and 22 in FIG. 3 is smaller at 42 than it is at 41. Slab thickness and/or average slab thickness may be selected to be less than the distance between two neighboring horizons, but this is not necessarily the case.

The invention is not limited to any specific type of seismic attribute. Seismic attributes are considered known to the seismic interpreter. Examples of attributes include, but are not limited to: semblance/coherency (and any dip-steered variants thereof), loop length, loop area, RMS, phase, frequency, spectral decomposition attributes, co-occurrency, multi-volume RGB blends, anisotropy, AVO, envelope, curvature, dip, azimuth, entropy, facies, loop attributes, noise filtered seismic, quadrature, sweetness and any recombination thereof. New useful attributes are under continuous development and any of these attributes can be rendered in the present invention.

The GUI allows the user to change the position of the interactive cursor 25 through the depth dimension in the 3D seismic data volume by interaction of the user with the user-input device 30. The computer system then dynamically updates attribute rendering as displayed on the second display 20b. Advantageously, the GUI re-determines what are the first and/or second nearest horizons for the new position of the interactive cursor 25 so that the user does not have to change the horizon selection by manual input. Changing position of the interactive cursor 25 may be done in the same way as the initial selection of the point, whereby selecting a new user-selected point. However, advantageous embodiments provide for a fixed-step interaction mode, in which said interaction of the user with user-input device induces the interactive cursor to change its position through the depth dimension by a pre-determined distance interval along the depth-axis. The user-input device may comprise one or more keys (35a,35b). The user interaction may in such cases involve tapping one of the keys, whereby each tap of the key induces the interactive cursor to move by said pre-determined distance. Preferably, no separate selection confirmation would be required in the fixed-step interaction mode. In other words, in fixed-step interaction mode, moving the interactive cursor to the next position and selecting the next position can both be activated upon a single gesture or command from the user. Suitably, the gesture is a key stroke. Examples of suitable keys for this purpose include arrow keys, specifically up-arrow and down-arrow keys (30b), respectively corresponding to advancing the interactive cursor to less deep and deeper locations by the pre-determined distance. Other keys may be employed, such as for instance a mouse key 30a. A mouse wheel (not shown) may also be a suitable user-interaction element. Such mouse wheel often can be advanced upward or downward by fixed amounts of rotation, which may suitably correspond to changing the position of the interactive cursor to less deep and deeper locations, respectively, by the pre-determined distance. Suitably, the user-input device comprises a plurality of keys, wherein each key of the plurality of keys corresponds to a different distance interval and/or direction along the depth-axis by which the interactive cursor is instructed to advance.

The pre-determined distance by which the interactive cursor changes position in the fixed-step interaction mode may be calculated from working information that is available in the computer system. Such working information suitably comprises one or more parameters selected from the group consisting of: a use-selected distance interval; a distance between two neighboring horizons; a slab thickness. Suitably, the pre-determined distance may be calculated as being a specific fraction of the slab thickness and/or average slab thickness. The fraction is preferably smaller than 1, so that advancing the interactive cursor 25 through the depth dimension results in gradually changing attribute renderings on the second display 20b because only a sub-selection of the data within the slab is replaced. Other useful ways to calculate a pre-determined distance is by calculating it as a fraction of the distance between two neighboring horizons. In this case the attribute renderings on the second display 20b space between the horizons may be viewed in a fixed number of steps between between two neighboring horizons. This way of calculating may be preferred for 2D renderings. Alternatively, a user-selected distance interval may be employed, which may be based on experience or on trial and error. The user will typically seek to be fed with the richest amount of information possible.

Figure 5:
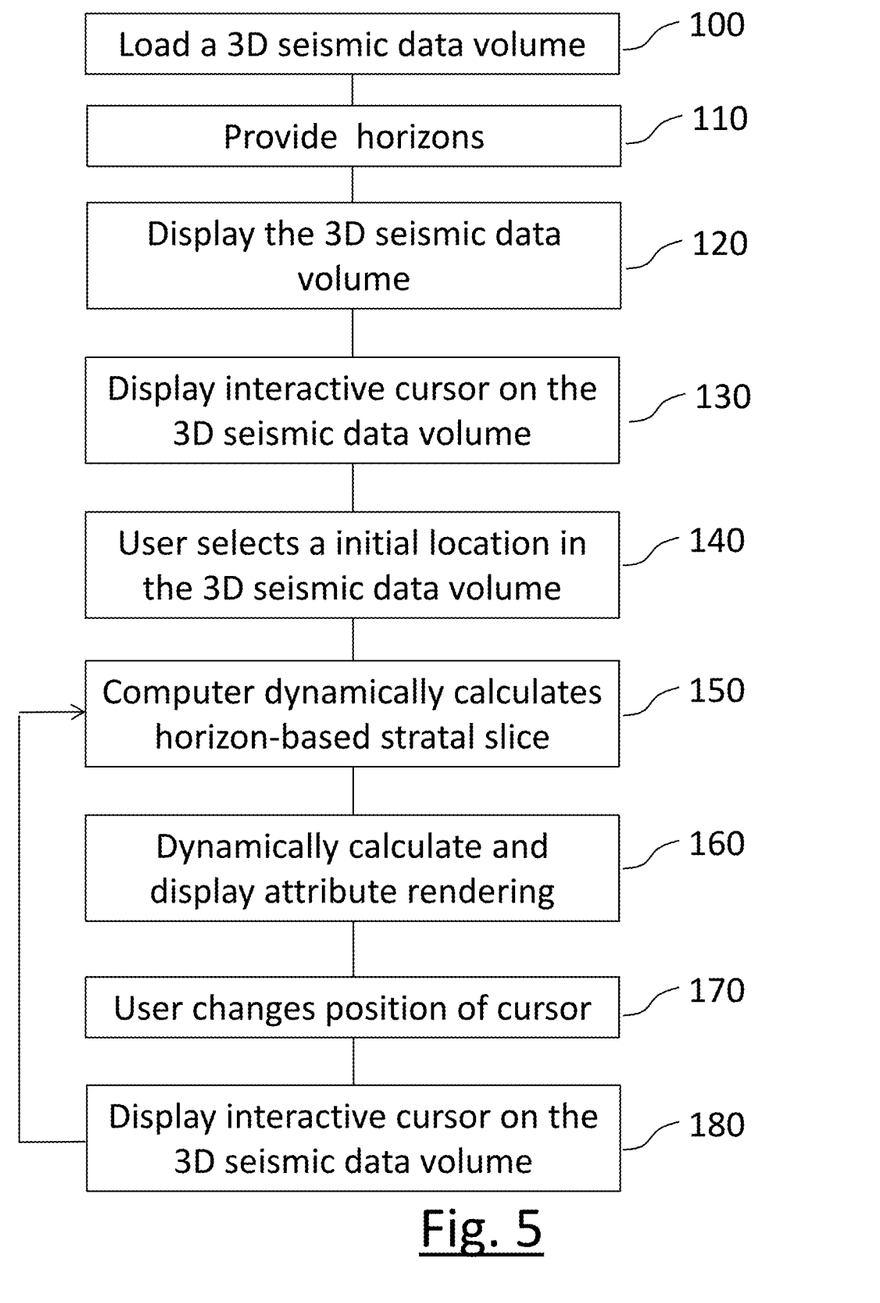
FIG. 5 shows a schematic flow diagram of a computer implemented method representing a graphical user interface.
Figure 6:
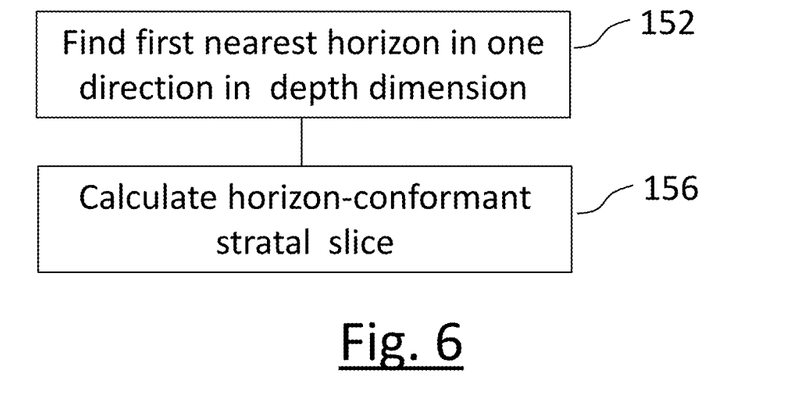
FIG. 6 shows an optional first group of embodiments that can be implemented in the method as illustrated in FIG. 4, wherein dynamically calculating a horizon-conformant stratal slice as illustrated in FIG. 2.
Figure 7:
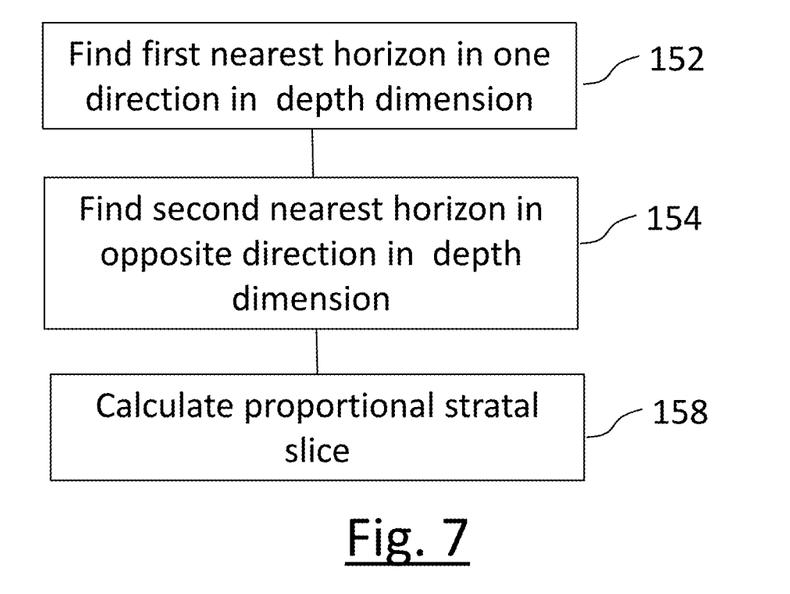
FIG. 7 shows an optional second group of embodiments that can be implemented in the method as illustrated in FIG. 4, wherein dynamically calculating a proportional stratal slice as illustrated in FIG. 3.

Embodiments of the computer-implemented method for generating and displaying attribute renderings from a seismic data volume is schematically illustrated in FIGS. 5-7. The various steps are represented sequentially but not all steps need to be carried out sequentially. For instance, the horizons may be provided before loading the 3D seismic data volume. Step 100 illustrates loading of the 3D seismic data volume into the first processing unit from the first computer readable memory. Step 110 illustrates providing of the plurality of horizons. Steps 120 and 130 illustrate displaying of the 3D seismic data volume, together with the interactive cursor. Step 140 illustrates the initial selection of a user-selected point within the 3D seismic data volume as indicated by the interactive cursor. This typically involves interacting of the user with the user-input device, whereby moving the interactive cursor on the first display to any point within the 3D seismic data volume, either on or between the plurality of horizons. The first selection is suitably done in direct-access interaction mode as described above, but it may also be done in fixed-step interaction mode. Step 150 illustrates dynamically performing of computer executable instructions with the effect of dynamically calculating a horizon-based stratal slice. The horizon-based stratal slice runs through the user-selected point. Step 160 illustrates the dynamically performing of computer executable instructions with the effect of generating a selected attribute rendering from seismic data that is contained within the slab that contains the horizon-based stratal slice that has been calculated in step 150. The selected attribute rendering is automatically displayed. Step 170 illustrates the user can change the position of the interactive cursor. While this can be done in the direct-access interaction mode, it is in practice convenient to change the interactive cursor in the fixed-step interaction mode as described above allowing the user to "step through" the 3D seismic data volume and see the attribute rendering change as the interactive cursor is advanced. As illustrated in optional step 180, the display of the interactive cursor is optionally updated in accordance with the changed position from step 170. In any case, the method is recurring steps 150 and 160, because following any change of the position of the interactive cursor in step 170 the method goes back to step 150 and dynamically calculates an updated horizon-based stratal slice and calculates and displays an updated attribute rendering, all in accordance with the new position of the interactive cursor. This allows the user to see changes and transitions in the attribute rendering as the interactive cursor is advanced through the 3D seismic data volume.

Suitably the step of dynamically calculating the horizon-based stratal slice in step 150 includes automatically finding the first nearest horizon such as illustrated in step 152 of FIGS. 6 and 7 and/or automatically finding the second nearest horizon as illustrated in step 154 of FIG. 7. This way the first nearest horizon is always kept up to date when calculating the horizon-based stratal slice. This may be useful when calculating horizon-conformant stratal slices, as illustrated in step 156 of FIG. 6, although a user can expect to see a relatively abrupt change in the displayed attribute rendering, particularly if the updated first nearest horizon is markedly different from the previously first nearest horizon at the step before crossing the horizon. However, when calculating proportional stratal slices as illustrated in step 158 in FIG. 7 and then basing the attribute rendering in step 160 on the thus calculated proportional stratal slice, the user will experience a very smooth transition when crossing a horizon, when the computer implemented method dynamically finds both the first nearest horizon in one direction (illustrated in step 152 of FIG. 7) and the second nearest horizon. The latter step is illustrated in step 154 in FIG. 7. Particularly in combination with advancing the interactive cursor using the fixed-step interaction mode as described above, the user experiences a minimalistic GUI. Horizon selection and attribute renderings are updated automatically upon minimalistic interaction with the computer system, such as by simple single key strokes or rotating of a mouse wheel. This way the user experiences a smooth and useful sequence of attribute renderings, which can more easily, more quickly and/or more interactively be interpreted and analyzed than before.

The present disclosure further relates to a computer-implemented method and/or computer system for identifying a reservoir rock imaged in a seismic attribute rendering to produce the mineral hydrocarbons from the reservoir rock and/or to store fluids in the reservoir rock. The seismic data volume discussed in the present disclosure may have been obtained by physically measuring seismic responses in geographical area of interest. The geographical area of interest may comprise one or more layers of reservoir rock, capable of holding producible mineral hydrocarbons, such as oil and/or gas, or of holding fluids for storage. Examples of such fluids include natural gas that has been produced elsewhere, and captured carbon dioxide. The selected attribute renderings shown on the second display may comprise attributes related to the reservoir rock. The computer-implemented method described herein may further comprise a step of using the selected attribute renderings to identify the reservoir rock from the constructed image to produce the mineral hydrocarbons from the reservoir rock and/or to store fluids in the reservoir rock. Subsequently to identifying a reservoir rock to produce the mineral hydrocarbons from the reservoir rock and/or to store fluids in the reservoir rock, mineral hydrocarbons may be produced from the reservoir rock and/or fluids may be stored in the reservoir rock.

The appended claims are written in single claim dependency format. Notwithstanding, combinations of independent claims with subject matter from multiple branches of single dependent claims combined, are contemplated and in scope of the present disclosure.

The person skilled in the art will understand that the present invention can be carried out in many various ways without departing from the scope of the appended claims.

That which is claimed is:

1. A computer system for generating and displaying attribute renderings from a seismic data volume, comprising:
   a first computer readable memory wherein a 3D seismic data volume is stored, said 3D seismic data volume comprising two lateral dimensions and one depth dimension;
   a second computer readable memory wherein a plurality of horizons is stored, of which plurality of horizons each horizon is a surface that connects selected seismic events in the 3D seismic data volume that have been associated with a single geological feature;
   a first display on which the 3D seismic data volume is shown, together with an interactive cursor;
   a user-input device configured to control the interactive cursor, by means of which a user can select any point within the 3D seismic data volume on or between said plurality of horizons;
   a first processing unit programmed with computer executable instructions to dynamically calculate a horizon-based stratal slice through the 3D seismic data volume based on at least one of the horizons of said plurality of horizons and which includes a user-selected point within the 3D seismic data volume on or between the plurality of horizons as indicated by the interactive cursor in response to interaction of the user with the user-input device;
   a second processing unit connected to the first processing unit, and programmed with computer executable instructions to dynamically generate a selected attribute rendering from seismic data that is contained within a slab that contains the horizon-based stratal slice;
   a second display on which the selected attribute rendering is shown.

2. The computer system of claim 1, wherein the selected attribute rendering is a 2D attribute map, represented in the two lateral dimensions, of a selected seismic attribute of the seismic data on the horizon-based stratal slice in which the user-selected point is comprised.

3. The computer system of claim 1, wherein the slab extends over a defined depth interval band around the horizon-based stratal slice in which the user-selected point is comprised, and wherein the selected attribute rendering is a volume rendering of a selected seismic attribute based on seismic data within the slab.

4. The computer system of claim 1, further comprising a third processing unit programmed with computer executable instructions to automatically identify a first nearest horizon of said plurality of horizons from the user-selected point, in a specified first direction along a depth axis in the depth dimension.

5. The computer system of claim 4, wherein the horizon-based stratal slice is a horizon-conformant slice relative to the first nearest horizon.

6. The computer system of claim 4, wherein the third processing unit is programmed to also identify a second nearest horizon of said plurality of horizons from the user-selected point, in a specified second direction along a depth axis in the depth dimension which second direction is opposite to the first direction.

7. The computer system of claim 6, wherein the horizon-based stratal slice is a proportional slice between the first nearest horizon and the second nearest horizon.

8. The computer system of claim 1, wherein the user can change the position of the interactive cursor through the depth dimension in the 3D seismic data volume by selecting a new user-selected point with the user-input device.

9. The computer system of claim 8, wherein the user-input device comprises a fixed-step interaction mode in which said interaction of the user with user-input device induces the interactive cursor to change its position through the depth dimension by a pre-determined distance interval along the depth-axis.

10. The computer system of claim 9, wherein the user-input device comprises a key, and wherein said interaction involves tapping one of the key, whereby each tap of the key induces the interactive cursor to move by said pre-determined distance.

11. The computer system of claim 10, wherein the user-input device comprises a plurality of keys, wherein each key of the plurality of keys corresponds to a different distance interval and/or direction along the depth-axis.

12. The computer system of claim 9, wherein the pre-determined distance is calculated from working information that is available in the computer system, wherein said working information comprises one or more parameters selected from the group consisting of: a user-selected distance interval, a distance between two neighboring horizons, a slab thickness.

13. A computer-implemented method for generating and displaying attribute renderings from a seismic data volume, comprising:
   loading into a first processing unit a 3D seismic data volume from a first computer readable memory, said 3D seismic data volume comprising two lateral dimensions and one depth dimension;
   providing in the first processing unit a plurality of horizons, of which plurality of horizons each horizon is a surface that connects selected seismic events in the 3D seismic data volume that have been associated with a single geological feature;
   displaying the 3D seismic data volume on a first display, together with an interactive cursor;
   interacting of a user with a user-input device, comprising moving the interactive cursor on the first display to any point within the 3D seismic data volume on or between said plurality of horizons with the interactive cursor, in response to said interacting with the user-input device, and selecting a user-selected point corresponding the point within the 3D seismic data volume as indicated by the interactive cursor;
   dynamically performing computer executable instructions in a first processing unit with the effect of dynamically calculating a horizon-based stratal slice through the 3D seismic data volume based on at least one of the horizons of said plurality of horizons and which includes the user-selected point;
   dynamically performing computer executable instructions in a second processing unit with the effect of generating a selected attribute rendering from seismic data that is contained within a slab that contains the horizon-based stratal slice;
   displaying the selected attribute rendering on a second display.

14. The computer-implemented method of claim 13, wherein the selected attribute rendering is a 2D attribute map, in the two lateral dimensions, of a selected seismic attribute of the seismic data on the horizon-based stratal slice in which the user-selected point is comprised.

15. The computer-implemented method of claim 13, wherein the selected attribute rendering is a volume rendering of a selected seismic attribute based on seismic data within a defined depth interval band around the horizon-based stratal slice in which the user-selected point is comprised.

16. The computer-implemented method of claim 13, further comprising executing computer executable instructions in a third processing unit with the effect of automatically identifying a first nearest horizon of said plurality of horizons from the user-selected point, in a specified first direction along a depth axis in the depth dimension.

17. The computer-implemented method of claim 16, wherein the horizon-based stratal slice is a horizon-conformant slice relative to the first nearest horizon.

18. The computer-implemented method of claim 17, further comprising executing computer executable instructions in the third processing unit with the effect of identifying a second nearest horizon of said plurality of horizons from the user-selected point, in a specified second direction along a depth axis in the depth dimension which second direction is opposite to the first direction.

19. The computer-implemented method of claim 18, wherein the horizon-based stratal slice is a proportional slice between the first nearest horizon and the second nearest horizon.

20. The computer-implemented method of claim 13, further comprising interacting of the user with the user-input device to change the position of the interactive cursor through the depth dimension in the 3D seismic data volume by selecting a new user-selected point.

* * * * *